(12) United States Patent
Kuo et al.

(10) Patent No.: US 10,152,130 B2
(45) Date of Patent: Dec. 11, 2018

(54) TOUCH APPARATUS

(71) Applicant: Acer Incorporated, New Taipei (TW)

(72) Inventors: Jin-Ting Kuo, New Taipei (TW);
Chih-Chiang Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/404,991

(22) Filed: Jan. 12, 2017

(65) Prior Publication Data
US 2018/0004292 A1    Jan. 4, 2018

(30) Foreign Application Priority Data

Jun. 30, 2016   (TW) .............................. 105120681 A

(51) Int. Cl.
| | | |
|---|---|---|
| G06F 3/01 | (2006.01) | |
| G06F 3/041 | (2006.01) | |
| G06F 3/044 | (2006.01) | |
| G06F 1/16 | (2006.01) | |

(52) U.S. Cl.
CPC ............ G06F 3/016 (2013.01); G06F 1/1626 (2013.01); G06F 1/1652 (2013.01); G06F 3/044 (2013.01); G06F 3/0416 (2013.01); G06F 2203/04102 (2013.01); G06F 2203/04103 (2013.01);
(Continued)

(58) Field of Classification Search
CPC ........ G06F 3/016; G06F 3/0416; G06F 3/044; G06F 2203/01402; G06F 1/1688; H04R 2400/03; H04R 2499/11; H04R 2499/15; H04R 3/04
See application file for complete search history.

(56) References Cited

U.S. PATENT DOCUMENTS

| | | |
|---|---|---|
| 7,903,091 B2 | 3/2011 | Lee et al. |
| 8,816,977 B2 | 8/2014 | Rothkopf et al. |
| (Continued) | | |

FOREIGN PATENT DOCUMENTS

| | | |
|---|---|---|
| EP | 2270627 | 1/2011 |
| TW | 201101137 | 1/2011 |
| (Continued) | | |

OTHER PUBLICATIONS

He Tian, et al., "Flexible, ultrathin, and transparent sound-emitting devices using silver nanowires film," Applied Physics Letters vol. 99, No. 25, Dec. 2011, pp. 253507-1-253507-4.
(Continued)

*Primary Examiner* — Liliana Cerullo
(74) *Attorney, Agent, or Firm* — J.C. Patents

(57) ABSTRACT

A touch apparatus is provided. The touch apparatus includes a substrate, at least one touch-sensing electrode, at least one vibration electrode, a touch control circuit and a vibration control circuit. The touch-sensing electrode and the vibration electrode are disposed in a first electrode layer on the substrate. The touch control circuit is electrically coupled to the touch-sensing electrode. The touch control circuit can sense a touch event of the touch apparatus through the touch-sensing electrode. The vibration control circuit is electrically coupled to the vibration electrode. The vibration control circuit can drive the vibration electrode to generate a vibration.

15 Claims, 9 Drawing Sheets

(52) U.S. Cl.
CPC .............. *G06F 2203/04111* (2013.01); *G06F 2203/04112* (2013.01)

(56) References Cited

U.S. PATENT DOCUMENTS

| | | | | |
|---|---|---|---|---|
| 2010/0045625 A1* | 2/2010 | Yang | ........................ | G06F 3/044 345/173 |
| 2011/0248935 A1* | 10/2011 | Mellow | ................. | G06F 1/1605 345/173 |
| 2013/0154973 A1* | 6/2013 | Tung | ........................ | G06F 3/041 345/173 |
| 2014/0146005 A1* | 5/2014 | Hong | ...................... | G06F 3/016 345/174 |
| 2014/0375580 A1* | 12/2014 | Peshkin | .................. | G06F 3/016 345/173 |
| 2015/0078604 A1* | 3/2015 | Seo | ........................ | H04R 1/028 381/333 |
| 2016/0062542 A1* | 3/2016 | Kim | ...................... | G06F 3/0416 345/174 |

FOREIGN PATENT DOCUMENTS

| | | |
|---|---|---|
| TW | M429927 | 5/2012 |
| TW | 201327640 | 7/2013 |

OTHER PUBLICATIONS

Ji Won Suk, et al., "Thermoacoustic Sound Generation from Monolayer Graphene for Transparent and Flexible Sound Sources," Advanced Materials, vol. 24, No. 47, Dec. 11, 2012, pp. 6342-6347.

* cited by examiner

TOUCH APPARATUS

CROSS-REFERENCE TO RELATED APPLICATION

This application claims the priority benefit of Taiwan application serial no. 105120681, filed on Jun. 30, 2016. The entirety of the above-mentioned patent application is hereby incorporated by reference herein and made a part of this specification.

BACKGROUND OF THE INVENTION

1. Field of the Invention

The invention relates to an electronic apparatus, and more particularly, to a touch apparatus.

2. Description of Related Art

A conventional touch apparatus is usually disposed with a touch panel, a speaker and other components. The touch panel can sense a touch event of the touch apparatus. The speaker can make a sound of the touch apparatus. Nonetheless, the conventional touch panel and the conventional speaker are different elements respectively occupying the inner space of the conventional touch apparatus.

SUMMARY OF THE INVENTION

The invention is directed to a touch apparatus in which an electrode layer can provide a touch-sensing function and a vibration function.

A touch apparatus is provided according to the embodiments of the invention. The touch apparatus includes a substrate, at least one touch-sensing electrode, at least one vibration electrode, a touch control circuit and a vibration control circuit. The touch-sensing electrode and the vibration electrode are disposed in a first electrode layer on the substrate. The touch control circuit is electrically coupled to the touch-sensing electrode. The touch control circuit can sense a touch event of the touch apparatus through the touch-sensing electrode. The vibration control circuit is electrically coupled to the vibration electrode. The vibration control circuit can drive the vibration electrode to generate a vibration.

Based on the above, according to the embodiments of the invention, the touch apparatus has a first electrode layer. The first electrode layer has at least one touch-sensing electrode and at least one vibration electrode. The touch control circuit can sense a touch event of the touch apparatus through the touch-sensing electrode. The vibration control circuit can drive the vibration electrode to generate a vibration. Accordingly, the touch-sensing function and the vibration function may be provided by the same first electrode layer. In some embodiments, the vibration function can generate the sound, and thus the first electrode layer can realize a speaker function.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
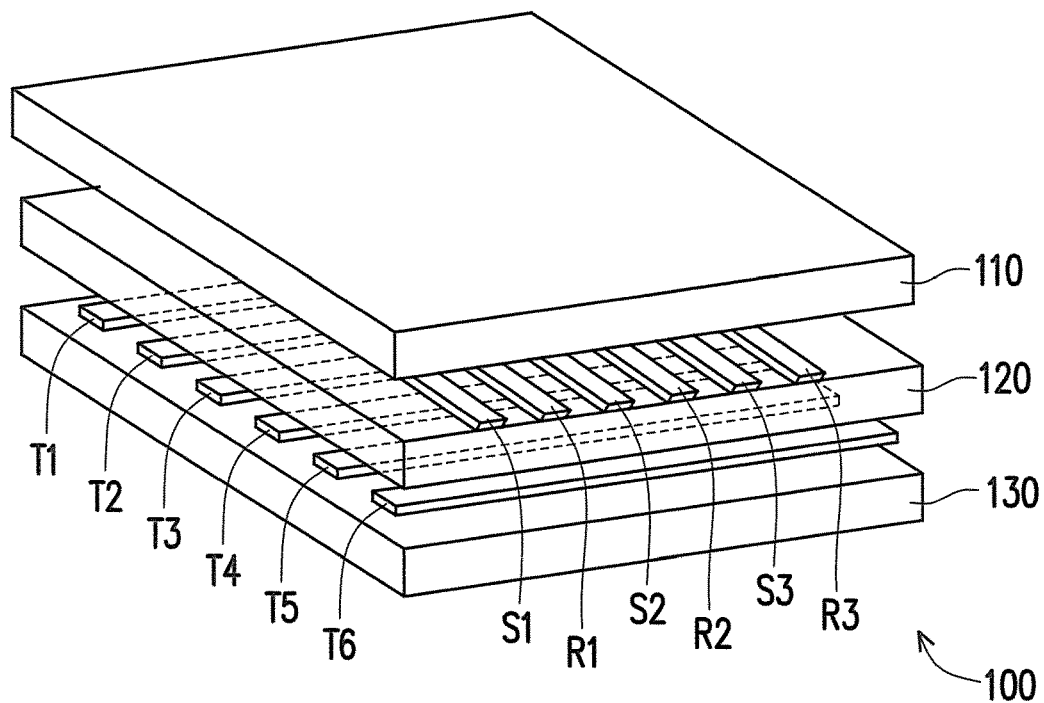
FIG. 1 is an explosion view illustrating a touch apparatus.

Reference will now be made in detail to the present preferred embodiments of the invention, examples of which are illustrated in the accompanying drawings. Wherever possible, the same reference numbers are used in the drawings and the description to refer to the same or like parts.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is an explosion view illustrating a touch apparatus 100. The touch apparatus 100 includes an upper cover 110, a substrate 120 and a display panel 130. Illustration of other components (e.g., a housing, a control circuit, etc.) of the touch apparatus 100 are omitted in FIG. 1. The display panel 130 may be any type of flat panel such as a LCD (liquid crystal display) panel, an OLED (organic light emitting diode) panel or a conventional display panel. The display panel 130 can provide a display function.

Figure 2:
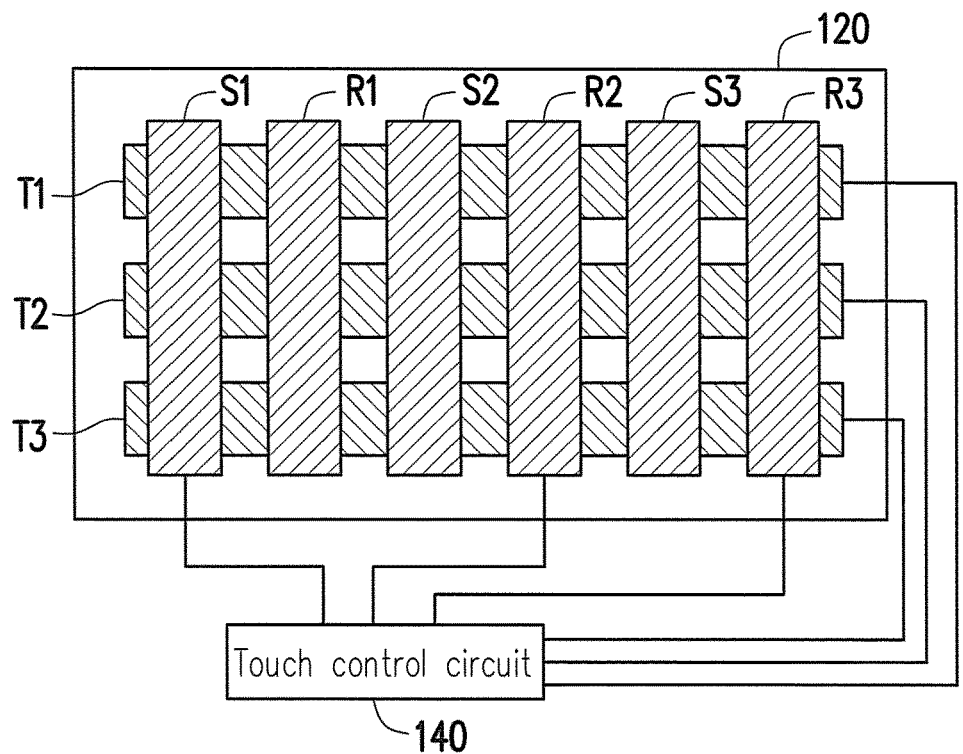
FIG. 2 is a schematic diagram illustrating a layout of the substrate of the touch apparatus.

FIG. 2 is a schematic diagram illustrating a layout of the substrate 120 of the touch apparatus 100. Referring to FIG. 1 and FIG. 2, a material of the substrate 120 may be plastic, glass or other transparent materials. Based on the characteristics of the display panel 130, the substrate 120 may be a rigid substrate or a flexible substrate. In other embodiments, it is possible that the display panel 130 is not disposed below the substrate 120. In this case, the material of the substrate 120 may be a non-transparent material.

At least one touch-sensing electrode (e.g., touch-sensing electrodes R1, R2 and R3 shown in FIG. 1) is disposed in a first electrode layer on the substrate 120, and at least one touch-driving electrode (e.g., touch-driving electrodes T1, T2, T3, T4, T5 and T6 shown in FIG. 1) is disposed in a second electrode layer below the substrate 120. Here, the first electrode layer is disposed on a first side of the substrate 120, and the second electrode layer is disposed on a second side of the substrate 120. A material of the touch-driving electrodes T1 to T6 and the touch-sensing electrodes R1 to R3 may be a transparent conductive material, such as indium tin oxide (ITO). In other embodiments, it is possible that the display panel 130 is not disposed below the substrate 120. In this case, the material of the touch-driving electrodes T1 to T6 and the touch-sensing electrodes R1 to R3 may be a non-transparent conductive material.

The touch-driving electrodes T1 to T6 and the touch-sensing electrodes R1 to R3 are coupled to a touch control circuit 140. The touch control circuit 140 can drive the touch-driving electrodes T1 to T6 and perform a touch detecting operation on the touch-sensing electrodes R1 to R3. The touch detecting operation may be a conventional touch detecting technology or other touch detecting methods, which are not particularly limited by the invention. For instance, the touch control circuit 140 may be a conventional touch circuit, and thus details regarding the same are not repeated hereinafter.

Based on manufacturing process requirements, the substrate 120 is further disposed with a plurality of dummy electrodes (e.g., electrodes S1, S2 and S3 shown in FIG. 1). As shown in FIG. 2, these electrodes S1 to S3 are not connected to the touch control circuit 140. The electrodes S1 to S3 and the touch-sensing electrodes R1 to R3 are all disposed in the first electrode layer on the substrate 120. A long axis direction of the electrodes S1 to S3 is parallel to a long axis direction of the touch-sensing electrodes R1 to R3, and a long axis direction of the touch-driving electrodes T1 to T6 is not parallel to the long axis direction of the touch-sensing electrodes R1 to R3. One vibration electrode among the electrodes S1 to S3 is disposed between two touch-sensing electrodes among the touch-sensing electrodes R1 to R3.

A material of the upper cover 110 may be plastic, glass or other transparent materials. Based on the characteristics of the display panel 130, the upper cover 110 may be a rigid upper cover or a flexible upper cover. For instance, the upper cover 110 may be a glass plate. In other embodiments, it is possible that the display panel 130 is not disposed below the upper cover 110. In this case, the material of the upper cover 110 may be a non-transparent material. The cover 110 covers on the substrate 120 to protect the substrate 120 and the touch-sensing electrodes R1 to R3.

Figure 3:
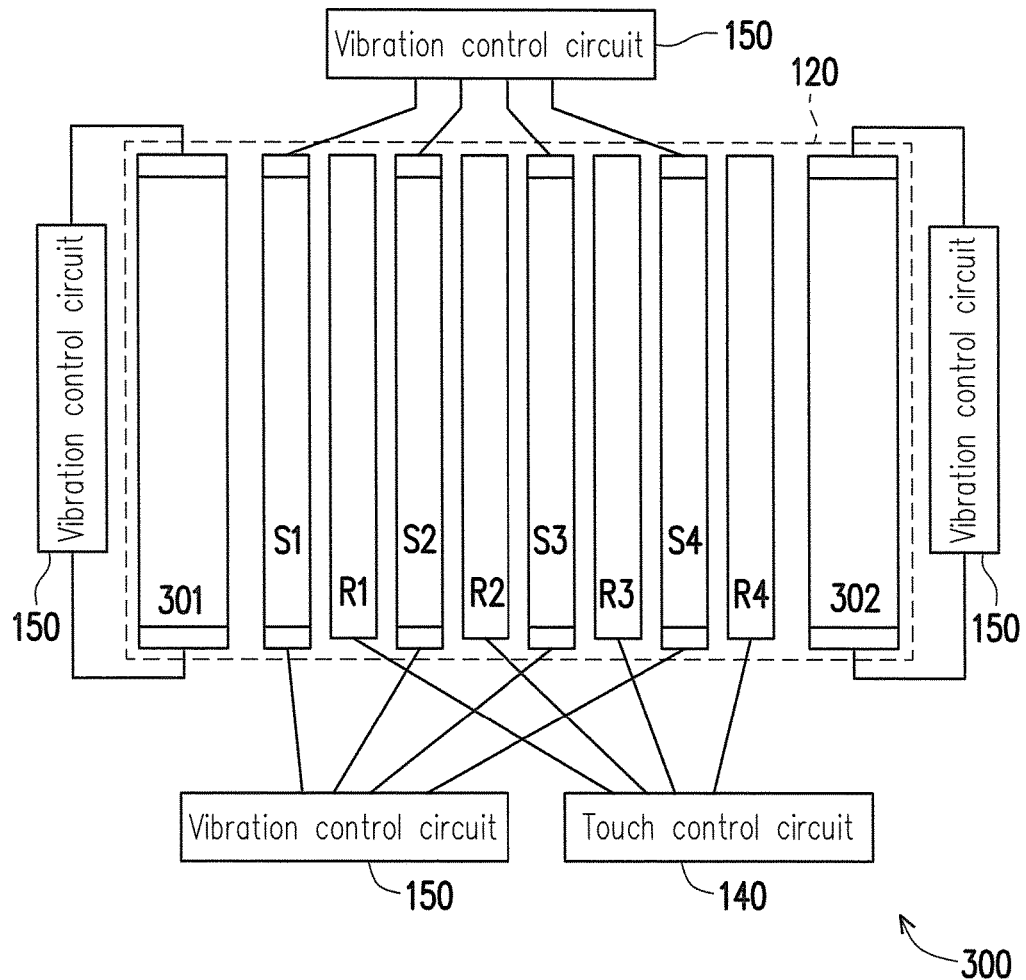
FIG. 3 is a block diagram illustrating circuitry of a touch apparatus according to an embodiment of the invention.

FIG. 3 is a block diagram illustrating circuitry of a touch apparatus 300 according to an embodiment of the invention. The touch apparatus 300 shown in FIG. 3 may refer to the related descriptions for FIG. 1 and FIG. 2. In the embodiment shown in FIG. 3, the touch apparatus 300 includes a substrate 120, at least one touch-sensing electrode (e.g., touch-sensing electrodes R1, R2, R3 and R4 shown in FIG. 3), at least one vibration electrode (e.g., vibration electrodes S1, S2, S3, S4, 301 and 302 shown in FIG. 3), a touch control circuit 140 and a vibration control circuit 150. The touch-sensing electrodes R1 to R4, the vibration electrodes S1 to S4, the vibration electrode 301 and the vibration electrode 302 are disposed in the same first electrode layer on the substrate 120. A long axis direction of the vibration electrodes S1, S2, S3, S4, 301 and 302 is parallel to a long axis direction of the touch-sensing electrodes R1 to R4. One vibration electrode among the vibration electrodes is disposed between two touch-sensing electrodes among the touch-sensing electrodes.

The touch control circuit 140 is electrically coupled to the touch-sensing electrodes R1 to R4. The touch control circuit 140 can sense a touch event of the touch apparatus 300 through the touch-sensing electrodes R1 to R4. The vibration control circuit 150 is electrically coupled to the vibration electrodes S1 to S4, the vibration electrode 301 and the vibration electrode 302. The vibration control circuit 150 can selectively drive one vibration electrode (or more vibration electrodes, or all vibration electrodes) among the vibration electrodes S1 to S4, the vibration electrode 301 and the vibration electrode 302 to generate a vibration.

Based on design requirements, in some embodiments, a material of the touch-sensing electrodes R1 to R4 may be identical to a material of the vibration electrodes S1 to S4, the vibration electrode 301 and the vibration electrode 302. In some other embodiments, the material of the touch-sensing electrodes R1 to R4 may be different from the material of the vibration electrodes S1 to S4, the vibration electrode 301 and the vibration electrode 302. For instance (but not limited thereto), the material of the touch-sensing electrodes R1 to R4 may be ITO or other transparent conductive materials. A material of the vibration electrodes S1 to S4, the vibration electrode 301 and/or the vibration electrode 302 may be a silver nano wire (SNW or Ag nanowire), a graphene or a carbon nano tube (CNT) or other transparent conductive materials.

Take the vibration electrode S1 for example, the vibration control circuit 150 can output an AC signal to two ends of the vibration electrode S1 to make the vibration electrode S1 generate the vibration. A vibration frequency of the vibration electrode S1 may be determined by adjusting a frequency of the AC signal. Based on different settings on the vibration frequency of the vibration electrode S1, the vibration electrode S1 may serve as a speaker or a vibrator. The other vibration electrodes S2 to S4, the vibration electrode 301 and the vibration electrode 302 may refer to the related description for the vibration electrode S1, which is not repeated hereinafter. Related operation regarding "how to drive the silver nano wire or the carbon nano tube by the vibration control circuit 150 in order to generate the vibration" belongs to the prior art, which is not repeated hereinafter.

Figure 4:
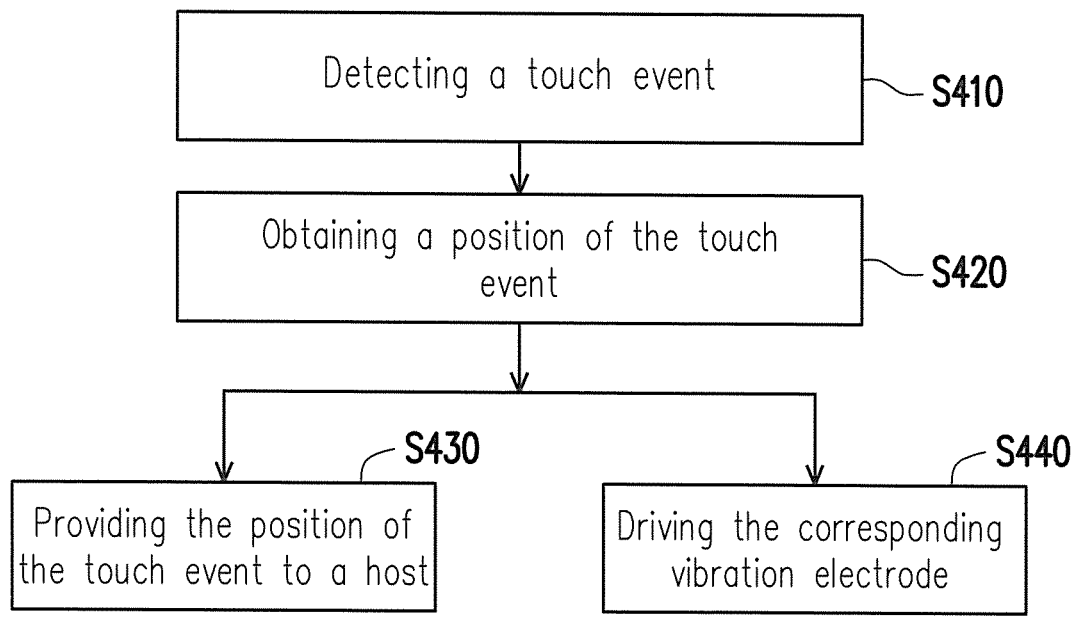
FIG. 4 is a flowchart illustrating an operating method of the touch apparatus according to an embodiment of the invention.

FIG. 4 is a flowchart illustrating an operating method of the touch apparatus 300 according to an embodiment of the invention. In step S410, The touch control circuit 140 can sense/detect a touch event of the touch apparatus 300 through the touch-sensing electrodes R1 to R4. When the touch event occurs on a position of one sensing electrode among the touch-sensing electrodes R1 to R4, the touch control circuit 140 can obtain the position of the touch event in step S420. The touch control circuit 140 can report the position of the touch event back to a host (e.g., an operating system or an application) in step S430. In addition, the touch control circuit 140 can further provide the position of the touch event to the vibration control circuit 150 in step S440. In step S440, the vibration control circuit 150 can selectively drive the corresponding vibration electrode according to the position of the touch event to generate the vibration. For instance, when the touch event occurs on a position of one sensing electrode R2 among the touch-sensing electrodes R1 to R4, the vibration control circuit 150 can selectively drive one vibration electrode among the vibration electrodes adjacent to the sensing electrode R2 to generate the vibration. The vibration function can provide a feedback to a touch operation. For instance, if the position of the touch event occurs between the touch-sensing electrodes R1 and R2, the vibration control circuit 150 can drive the vibration electrode S2 to generate the vibration, or drive the vibration electrodes S1, S2 or S3 to generate the vibration. Accordingly, the touch apparatus 300 can provide the sensing function and the vibration function.

Figure 5:
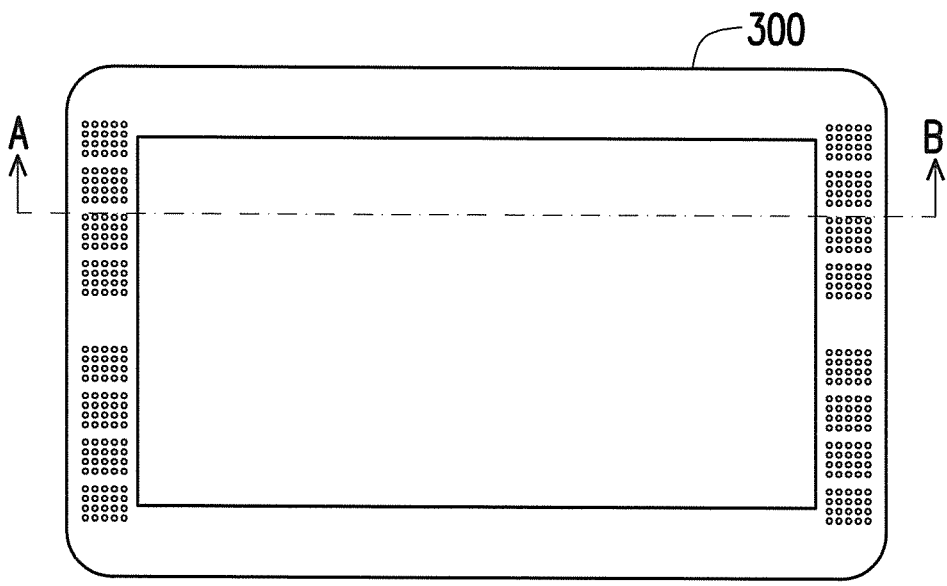
FIG. 5 is a top view illustrating an exterior of the touch apparatus according to an embodiment of the invention.
Figure 6:
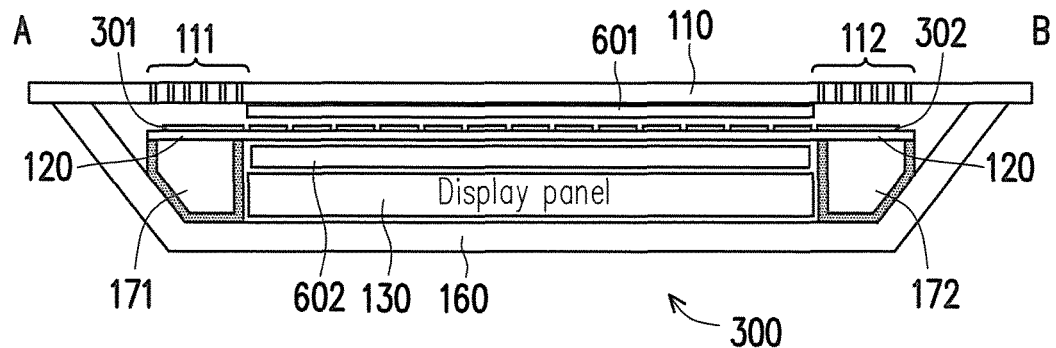
FIG. 6 is a cross-sectional diagram illustrating the touch apparatus depicted in FIG. 5 along sectional line A-B according to an embodiment of the invention.

FIG. 5 is a top view illustrating an exterior of the touch apparatus 300 according to an embodiment of the invention. FIG. 6 is a cross-sectional diagram illustrating the touch apparatus 300 depicted in FIG. 5 along sectional line A-B according to an embodiment of the invention. A housing 160 is configured to accommodate the substrate 120, the touch control circuit 140 and the vibration control circuit 150 shown in FIG. 3. Here, it is assumed that the vibration electrodes 301 and 302 are configured to serve as a sound electrode, and the sound electrode generates a sound through the vibration. Referring to FIG. 6, the upper cover 110 is disposed on the substrate 120, where the first electrode layer (i.e., the touch-sensing electrodes R1 to R4, the vibration electrodes S1 to S4, the vibration electrode 301 and the vibration electrode 302 shown in FIG. 3) is disposed between the substrate 120 and the upper cover 110. The substrate 120 can be adhered below the upper cover 110 by a gel 601. The display panel 130 is disposed below the substrate 120. The display panel 130 can be adhered below the substrate 120 by a gel 602.

Perforated structures 111 and 112 are disposed on the upper cover 110. Based on design requirements, an opening shape of the perforated structures 111 and 112 may be round, elongated or other geometric shapes. A position of the perforated structure 111 corresponds to the vibration electrode 301 (one of the sound electrodes) to make the sound made by the vibration electrode 301 pass through the upper cover 110 via the perforated structure 111. A position of the perforated structure 112 corresponds to the vibration electrode 302 (another one of the sound electrodes) to make the sound made by the vibration electrode 302 pass through the upper cover 110 via the perforated structure 112. Resonance chambers 171 and 172 are disposed below the substrate 120. A position of the resonance chamber 171 corresponds to the vibration electrode 301 (one of the sound electrodes), and a position of the resonance chamber 172 corresponds to the vibration electrode 302 (another one of the sound electrodes).

Figure 7:
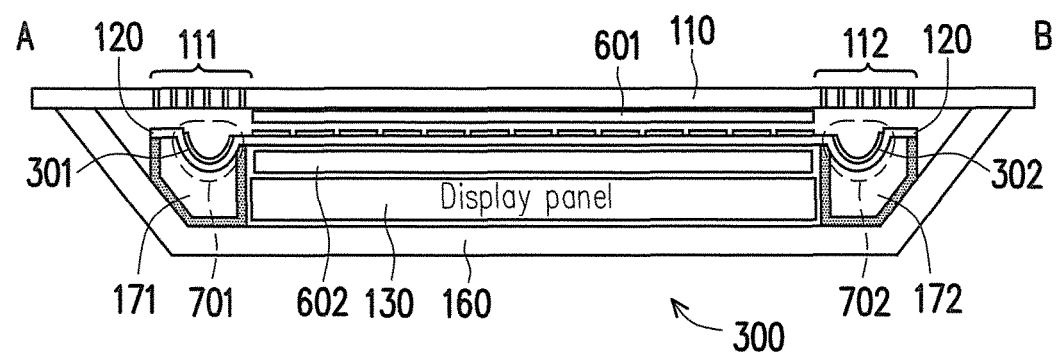
FIG. 7 is a cross-sectional diagram illustrating the touch apparatus depicted in FIG. 5 along sectional line A-B according to another embodiment of the invention.

FIG. 7 is a cross-sectional diagram illustrating the touch apparatus 300 depicted in FIG. 5 along sectional line A-B according to another embodiment of the invention. Here, it is assumed that the vibration electrodes 301 and 302 are configured to serve as a sound electrode, and the sound electrode generates a sound through the vibration. The embodiment shown in FIG. 7 may refer to the related description for FIG. 6, which is not repeated hereinafter. In the embodiment shown in FIG. 7, the substrate 120 has curved portions 701 and 702. The vibration electrode 301 (one of the sound electrodes) is disposed on the curved portion 701, and a frequency of the sound made by the vibration electrode 301 is affected by determining a curvature of the curved portion 701. The vibration electrode 302 (another one of the sound electrodes) is disposed on the curved portion 702, and a frequency of the sound made by the vibration electrode 302 is affected by determining a curvature of the curved portion 702. For instance, the frequency of the sound made by the vibration electrode (one of the sound electrodes) is lower if the curvature of the curved portion is greater.

Figure 8:
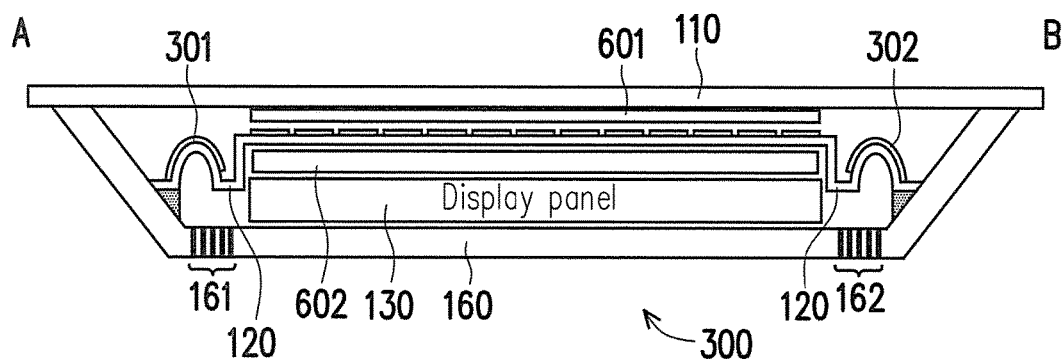
FIG. 8 is a cross-sectional diagram illustrating the touch apparatus depicted in FIG. 5 along sectional line A-B according to yet another embodiment of the invention.

FIG. 8 is a cross-sectional diagram illustrating the touch apparatus 300 depicted in FIG. 5 along sectional line A-B according to yet another embodiment of the invention. Here, it is assumed that the vibration electrodes 301 and 302 are configured to serve as a sound electrode, and the sound electrode generates a sound through the vibration. The embodiment shown in FIG. 8 may refer to related descriptions for FIG. 6 and/or FIG. 7, which are not repeated hereinafter. In the embodiment shown in FIG. 8, the upper cover 110 does not have the perforated structure, and instead, perforated structures 161 and 162 are disposed on the housing 160. A position of the perforated structure 161 corresponds to the vibration electrode 301 (one of the sound electrodes) to make the sound made by the vibration electrode 301 pass through the housing 160 via the perforated structure 161. A position of the perforated structure 162 corresponds to the vibration electrode 302 (another one of the sound electrodes) to make the sound made by the vibration electrode 302 pass through the housing 160 via the perforated structure 162.

Figure 9:
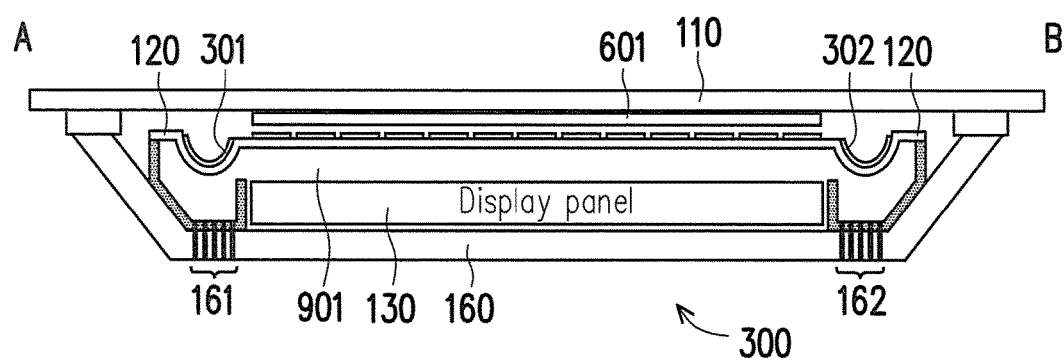
FIG. 9 is a cross-sectional diagram illustrating the touch apparatus depicted in FIG. 5 along sectional line A-B according to still another embodiment of the invention.

FIG. 9 is a cross-sectional diagram illustrating the touch apparatus 300 depicted in FIG. 5 along sectional line A-B according to still another embodiment of the invention. Here, it is assumed that the vibration electrodes 301 and 302 are configured to serve as a sound electrode, and the sound electrode generates a sound through the vibration. The embodiment shown in FIG. 9 may refer to related descriptions for FIG. 7 and/or FIG. 8, which are not repeated hereinafter. In the embodiment shown in FIG. 9, the display panel 130 is adhered on an internal surface of the housing 160. A gap 901 is provided between the display panel 130 and the substrate 120. The gap 901 may be configured to serve as a resonance chamber of the sound electrode which makes the sound pass through the housing 160 via the perforated structure 162.

Figure 10A:
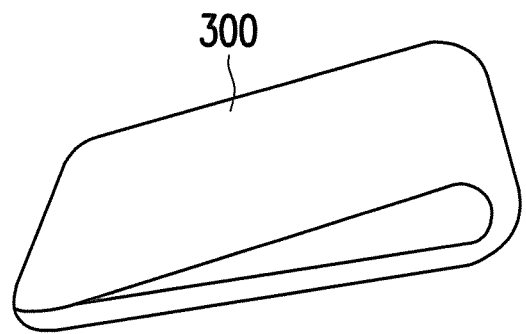
FIG. 10A and FIG. 10B are schematic diagrams illustrating the exterior of the touch apparatus according to another embodiment of the invention.
Figure 10B:
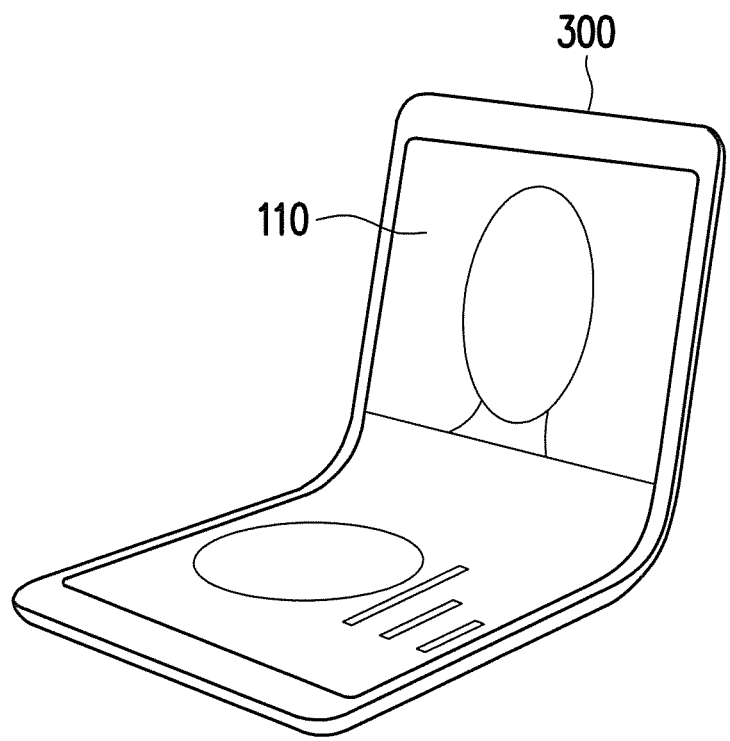

FIG. 10A and FIG. 10B are schematic diagrams illustrating the exterior of the touch apparatus 300 according to another embodiment of the invention. In the present embodiment, the touch apparatus 300 may be bent. Therefore, the touch apparatus 300 may be implemented as a foldable smart phone or other application apparatus. FIG. 10A illustrates a schematic diagram of the touch apparatus 300 that is closed after being bent. FIG. 10B illustrates a schematic diagram of the touch apparatus 300 that is opened so that the upper cover 110 (a touch/display region) is exposed.

Figure 11:
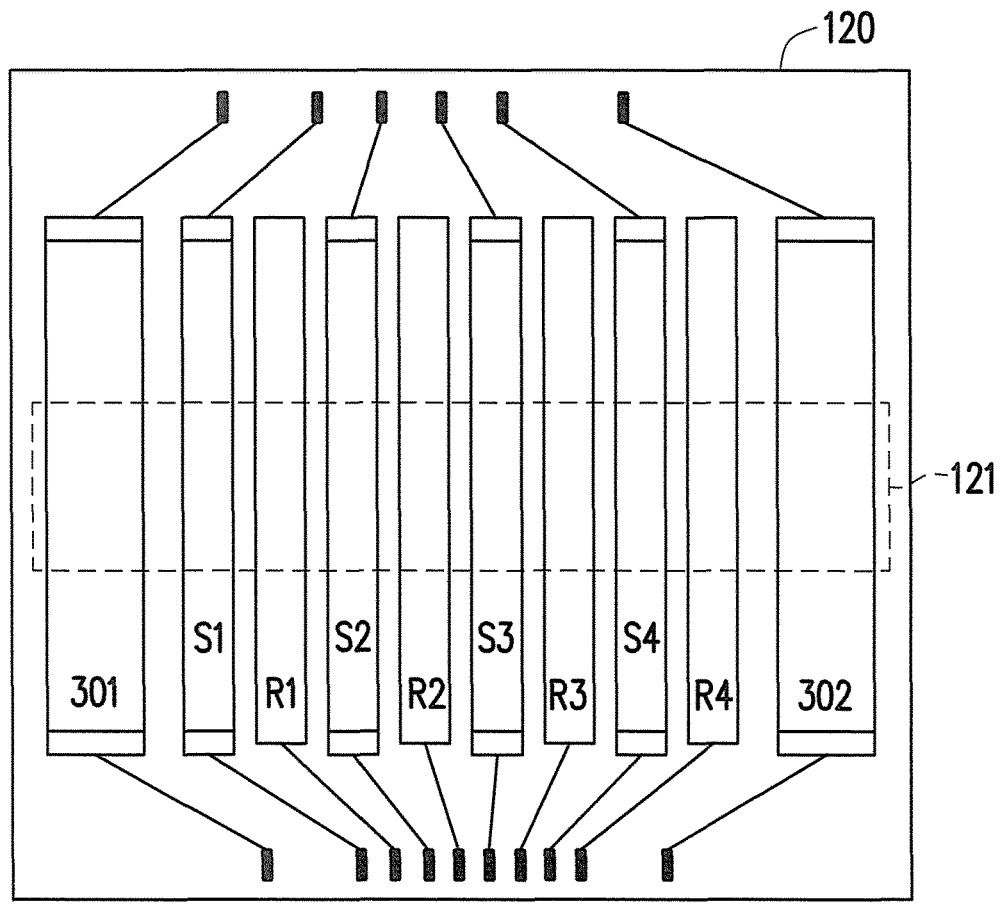
FIG. 11 is a schematic diagram illustrating a layout of the substrate of the touch apparatus depicted in FIG. 10A and FIG. 10B according to an embodiment of the invention.

FIG. 11 is a schematic diagram illustrating a layout of the substrate 120 of the touch apparatus 300 depicted in FIG. 10A and FIG. 10B according to an embodiment of the invention. The substrate 120 shown in FIG. 11 may refer to the related description for FIG. 3, which is not repeated hereinafter. In the present embodiment, the display panel of the touch apparatus 300 may be the OLED (organic light emitting display) panel or other flexible display panels. Based on the flexibility of the display panel, the substrate 120 shown in FIG. 11 has a bending region 121, and the touch-sensing electrodes R1 to R4 and the vibration electrodes 301 and 302 (the sound electrodes) pass through the bending region 121.

In the embodiment shown in FIG. 11, the touch control circuit 140 can further sense a bending event of the bending region 121 through the sensing electrodes R1 to R4. For instance, the touch control circuit 140 can sense a capacitance variation of the sensing electrodes R1 to R4 to determine whether or not the bending event occurs. When the bending event occurs, the vibration control circuit 150 can correspondingly increase a control voltage (a DC level of signal) of the vibration electrodes 301 and 302 (the sound electrodes) according to the bending event, so as to gain a low frequency component of the sound.

Figure 12:
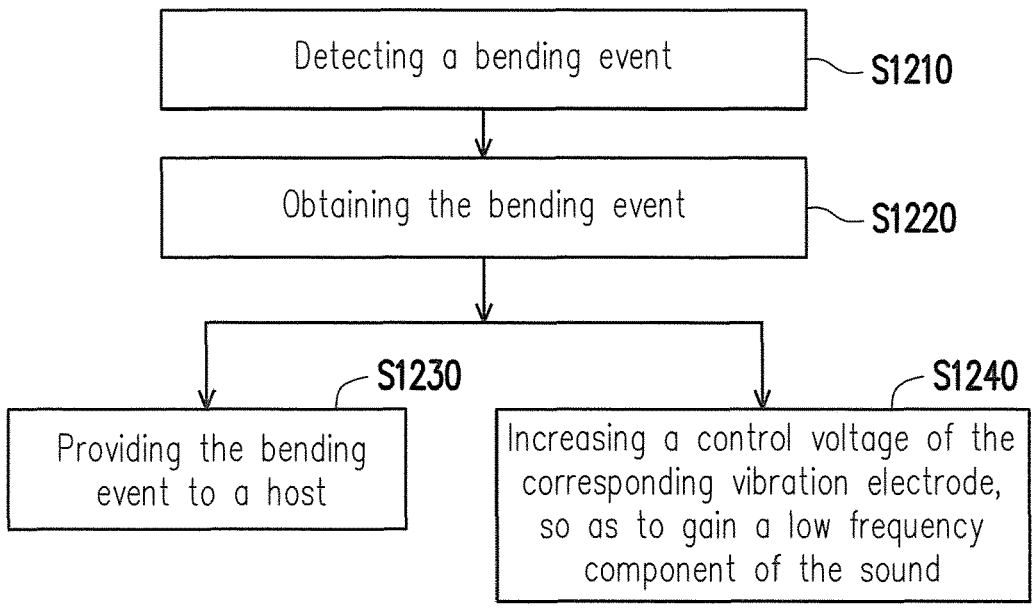
FIG. 12 is a flowchart illustrating an operating method of the touch apparatus according to another embodiment of the invention.

FIG. 12 is a flowchart illustrating an operating method of the touch apparatus 300 according to another embodiment of the invention. In step S1210, the touch control circuit 140 can sense/detect a bending event of the touch apparatus 300 through the touch-sensing electrodes R1 to R4. When the bending event occurs in the bending region 121, the touch control circuit 140 can obtain a bending degree of the bending event in step S1220. The touch control circuit 140 can report the bending event back to a host (e.g., an operating system or an application) in step S1230. In addition, the touch control circuit 140 can further provide the bending degree of the bending event to the vibration control circuit 150 in step S1240. In step S1240, the vibration control circuit 150 can correspondingly increase a control voltage (a DC level of signal) of the vibration electrodes 301 and 302 (one of the sound electrodes) according to the bending degree of the bending event, so as to gain a low frequency component of the sound.

Figure 13:
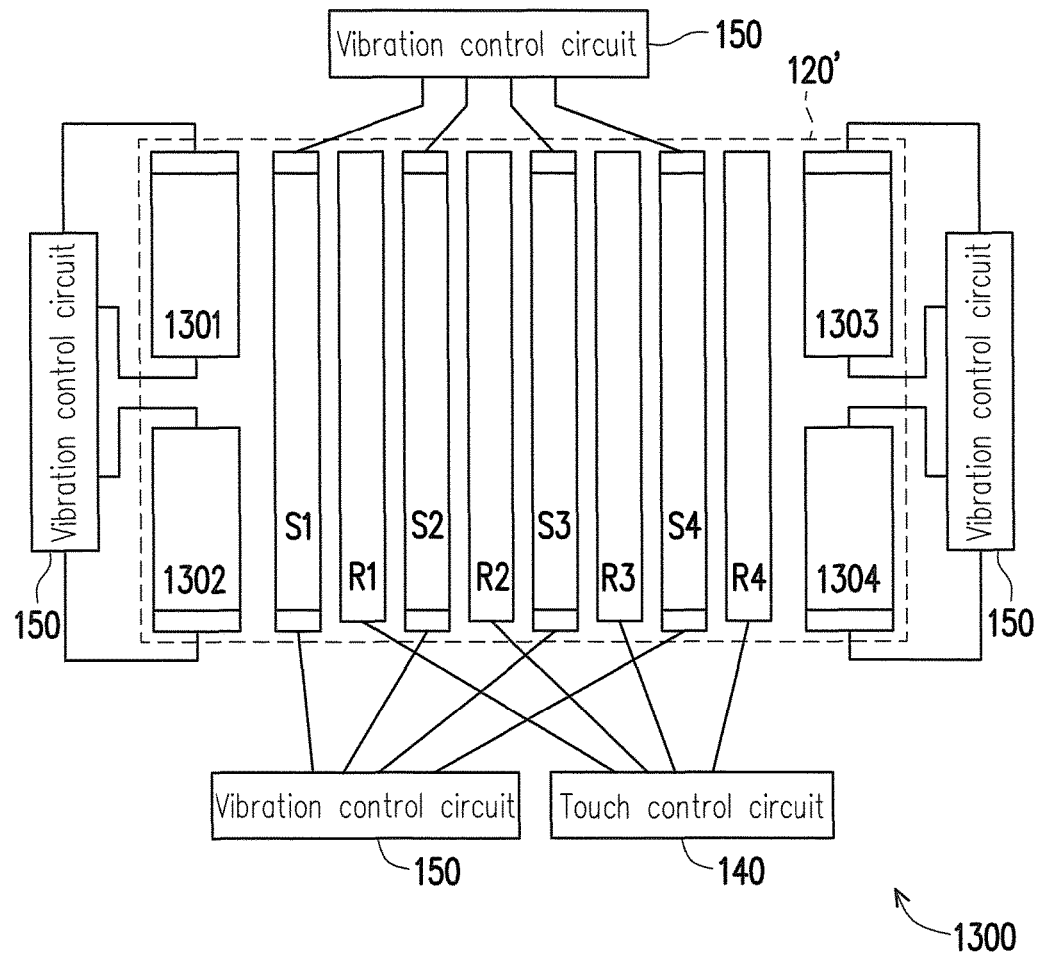
FIG. 13 is a block diagram illustrating circuitry of a touch apparatus according to another embodiment of the invention.

FIG. 13 is a block diagram illustrating circuitry of a touch apparatus 1300 according to another embodiment of the invention. The touch apparatus 1300 shown in FIG. 13 may refer to the related description for and FIG. 3. In the embodiment shown in FIG. 13, the touch apparatus 1300 includes a substrate 120', at least one touch-sensing electrode (e.g., touch-sensing electrodes R1, R2, R3 and R4 shown in FIG. 13), at least one vibration electrode (e.g., vibration electrodes S1, S2, S3, S4, 1301, 1302, 1303 and 1304 shown in FIG. 13), a touch control circuit 140 and a vibration control circuit 150. The touch-sensing electrodes R1 to R4, the vibration electrodes S1 to S4, and the vibration electrodes 1301 to 1304 are disposed in the same first electrode layer on the substrate 120. A long axis direction of the vibration electrodes S1 to S4 and 1301 to 1304 is parallel to a long axis direction of the touch-sensing electrodes R1 to R4.

The touch control circuit 140 is electrically coupled to the touch-sensing electrodes R1 to R4. The touch control circuit 140 can sense a touch event of the touch apparatus 300 through the touch-sensing electrodes R1 to R4. The vibration control circuit 150 is electrically coupled to the vibration electrodes S1 to S4 and the vibration electrodes 1301 to 1304. The vibration control circuit 150 can selectively drive one vibration electrode (or more vibration electrodes, or all vibration electrodes) among the vibration electrodes S1 to S4 and the vibration electrodes 1301 to 1304 to generate a vibration. Based on design requirements, a material of the touch-sensing electrodes R1 to R4 may be identical to (or different from) a material of the vibration electrodes S1 to S4 and the vibration electrodes 1301 to 1304. For instance (but not limited thereto), the material of the touch-sensing electrodes R1 to R4 may be ITO or other transparent conductive materials. A material of the vibration electrodes S1 to S4 and/or the vibration electrodes 1301 to 1304 may be a silver nano wire (SNW or Ag nanowire), a graphene or a carbon nano tube (CNT) or other transparent conductive materials.

In the embodiment shown in FIG. 13, the vibration electrodes 1301 and 1303 may serve as a first sound electrode, and the vibration electrodes 1302 and 1304 may serve as a second sound electrode. The vibration control circuit 150 can drive the first sound electrode to generate a normal audio frequency, and the vibration control circuit 150 can drive the second drive the second sound electrode to generate a low audio frequency. Other implementation details of the vibration electrodes 1301 to 1304 shown in FIG. 13 may refer to the related descriptions for the vibration electrodes 301 and 302 in FIG. 3 to FIG. 12, which are not repeated hereinafter.

Figure 14:
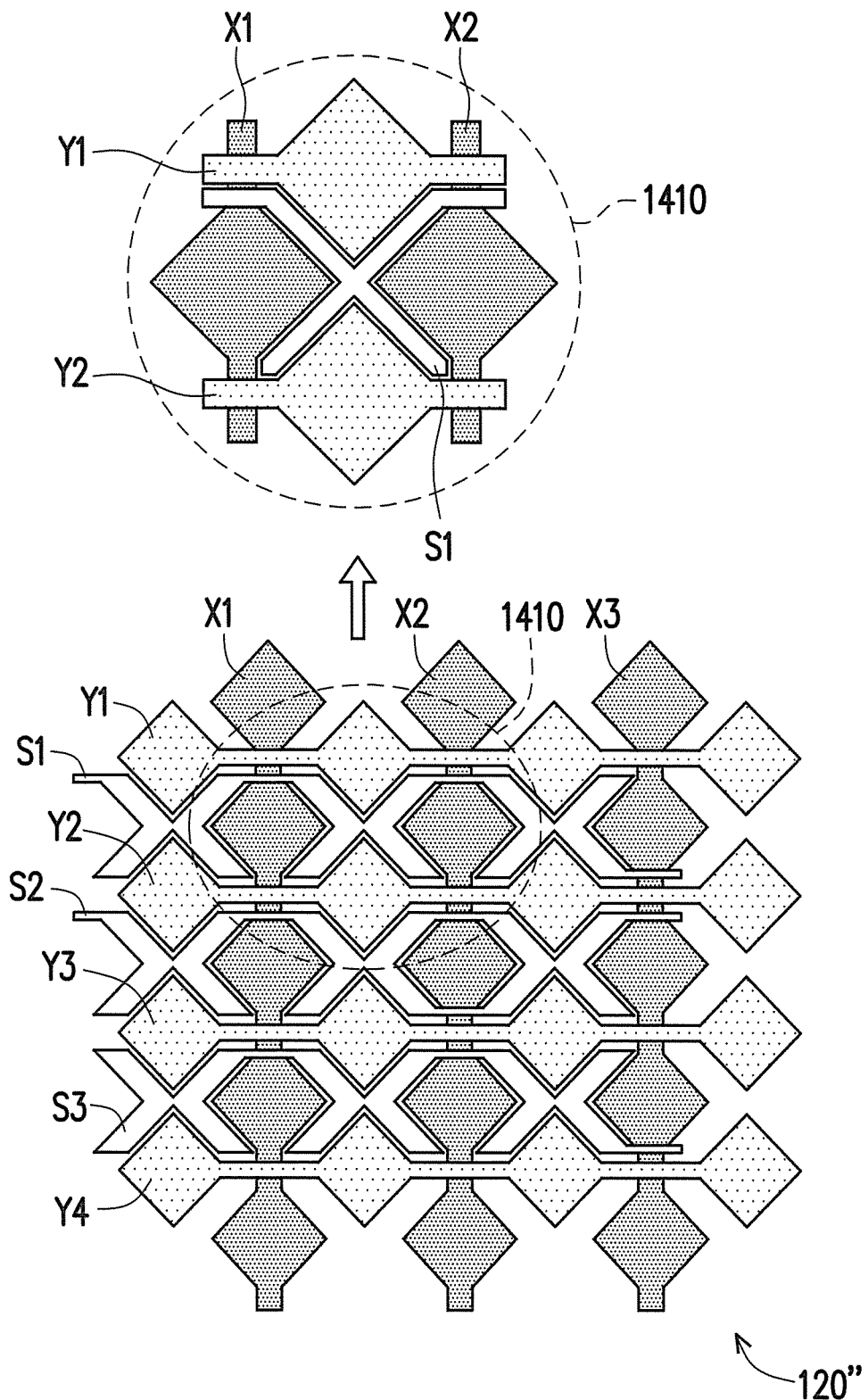
FIG. 14 is a schematic diagram illustrating a layout of a substrate according to another embodiment of the invention.

FIG. 14 is a schematic diagram illustrating a layout of a substrate 120" according to another embodiment of the invention. The embodiment depicted in FIG. 14 may refer to the related descriptions for FIG. 3, FIG. 11 and FIG. 13. In the embodiment shown in FIG. 14, the substrate 120" includes at least one touch-sensing electrode (touch-sensing electrodes Y1, Y2, Y3 and Y4 shown in FIG. 14), at least one touch-driving electrode (e.g., touch-driving electrodes X1, X2 and X3 shown in FIG. 14) and at least one vibration electrode (e.g., vibration electrodes S1, S2 and S3 shown in FIG. 14). The touch-sensing electrodes Y1 to Y4, the touch-driving electrodes X1 to X3, and the vibration electrodes S1 to S3 are disposed in the same first electrode layer on the substrate 120". An extending direction of the vibration electrodes S1 to S3 is parallel to an extending direction of the touch-sensing electrodes Y1 to Y4. An extending direction of the touch-driving electrodes X1 to X3 is not parallel to the extending direction of the touch-sensing electrodes Y1 to Y4. A part 1410 of the substrate 120" is enlarged and re-illustrated on an upper portion of FIG. 14, in which the vibration electrode S1 is disposed between the touch-sensing electrode Y1 and the touch-driving electrode X1, and is disposed between the touch-sensing electrode Y2 and the touch-driving electrode X2.

It should be noted that, under different application scenarios, related functions of the touch control circuit 140 and/or the vibration control circuit 150 in the foregoing embodiments may be implemented as software, firmware or hardware by utilizing common programming languages (e.g., C or C++), hardware description languages (e.g., Verilog HDL or VHDL) or other suitable programming languages. The software (or the firmware) capable of executing the related functions may be arranged into any known computer-accessible media such as magnetic tapes, semiconductor memories, magnetic disks or compact disks (e.g., CD-ROM or DVD-ROM); or the software (or the firmware) may be transmitted via the Internet, a wired communication, a wireless communication or other communication mediums. Said software (or the firmware) may be stored in the computer-accessible media, so that a computer processor can access/execute programming codes of the software (or the firmware). In addition, the device and the method of the invention may be implemented by a combination of software and hardware.

In summary, according to various embodiments of the invention, the touch apparatus has a first electrode layer. The first electrode layer has at least one touch-sensing electrode and at least one vibration electrode. The touch control circuit 140 can sense a touch event of the touch apparatus through the touch-sensing electrode. The vibration control circuit 150 can drive the vibration electrode to generate a vibration. Accordingly, the touch-sensing function and the vibration function may be provided by the same first electrode layer.

In some embodiments, the vibration function can provide the feedback to the touch operation. In some other embodiments, the vibration function can generate the sound, and thus the first electrode layer can realize a speaker function without additionally disposing the conventional speaker element.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A touch apparatus, comprising:
   a substrate;
   at least one touch-sensing electrode, disposed in a first electrode layer on the substrate;
   at least one vibration electrode, disposed in the first electrode layer;
   a touch control circuit, electrically coupled to the at least one touch-sensing electrode, and configured to sense a touch event of the touch apparatus through the at least one touch-sensing electrode;
   a vibration control circuit, electrically coupled to the at least one vibration electrode, and configured to drive the at least one vibration electrode to generate a vibration, wherein one of the at least one vibration electrode is a sound electrode, and the sound electrode generates a sound through the vibration;
   an upper cover, disposed on the substrate, wherein the first electrode layer is disposed between the substrate and the upper cover; and
   a perforated structure, disposed on the upper cover, wherein a position of the perforated structure corresponds to a position of the sound electrode to make the sound pass through the upper cover via the perforated structure.

2. The touch apparatus according to claim 1, wherein the substrate is a flexible substrate.

3. The touch apparatus according to claim 1, wherein a material of the vibration electrode comprises a silver nano wire, a graphene or a carbon nano tube.

4. The touch apparatus according to claim 1, wherein a material of the vibration electrode is different from a material of the touch-sensing electrode.

5. The touch apparatus according to claim 1, wherein a long axis direction of the vibration electrode is parallel to a long axis direction of the touch-sensing electrode.

6. The touch apparatus according to claim 5, wherein one vibration electrode among the at least one vibration electrode is disposed between two touch-sensing electrodes among the at least one touch-sensing electrode.

7. The touch apparatus according to claim 1, further comprising:
   at least one touch-driving electrode, disposed in a second electrode layer below the substrate, wherein the first electrode layer is disposed on a first side of the substrate, and the second electrode layer is disposed on a second side of the substrate.

8. The touch apparatus according to claim 7, wherein a long axis direction of the touch-driving electrode is not parallel to a long axis direction of the touch-sensing electrode.

9. The touch apparatus according to claim 1, further comprising:
   at least one touch-driving electrode, disposed in the first electrode layer,
   wherein the vibration electrode is disposed between the touch-sensing electrode and the touch-driving electrode.

10. The touch apparatus according to claim 1, wherein when the touch event occurs on a position of one sensing electrode among the at least one touch-sensing electrode, the vibration control circuit selectively drives one vibration electrode among the at least one vibration electrode adjacent to the sensing electrode to generate the vibration.

11. The touch apparatus according to claim 1, further comprising:
    a resonance chamber, disposed below the substrate, wherein a position of the resonance chamber corresponds to a position of the sound electrode.

12. The touch apparatus according to claim 1, wherein the at least one vibration electrode comprises a first sound electrode and a second sound electrode, the vibration control circuit drives the first sound electrode to generate a first audio frequency, and the vibration control circuit drives the second sound electrode to generate a second audio frequency which is lower than the first audio frequency.

13. A touch apparatus, comprising:
    a substrate;
    at least one touch-sensing electrode, disposed in a first electrode layer on the substrate;
    at least one vibration electrode, disposed in the first electrode layer;
    a touch control circuit, electrically coupled to the at least one touch-sensing electrode, and configured to sense a touch event of the touch apparatus through the at least one touch-sensing electrode; and
    a vibration control circuit, electrically coupled to the at least one vibration electrode, and configured to drive the at least one vibration electrode to generate a vibration, wherein one of the at least one vibration electrode is a sound electrode, and the sound electrode generates a sound through the vibration,
    wherein the substrate has a curved portion, the sound electrode is disposed on the curved portion, and a frequency of the sound is affected by determining a curvature of the curved portion.

14. A touch apparatus, comprising:
    a substrate;
    at least one touch-sensing electrode, disposed in a first electrode layer on the substrate;
    at least one vibration electrode, disposed in the first electrode layer;
    a touch control circuit, electrically coupled to the at least one touch-sensing electrode, and configured to sense a touch event of the touch apparatus through the at least one touch-sensing electrode;
    a vibration control circuit, electrically coupled to the at least one vibration electrode, and configured to drive the at least one vibration electrode to generate a vibration, wherein one of the at least one vibration electrode is a sound electrode, and the sound electrode generates a sound through the vibration;
    a housing, configured to accommodate the substrate, the touch control circuit and the vibration control circuit; and
    a perforated structure, disposed on the housing, wherein a position of the perforated structure corresponds to a position of the sound electrode to make the sound pass through the housing via the perforated structure.

15. A touch apparatus, comprising:
a substrate;
at least one touch-sensing electrode, disposed in a first electrode layer on the substrate;
at least one vibration electrode, disposed in the first electrode layer;
a touch control circuit, electrically coupled to the at least one touch-sensing electrode, and configured to sense a touch event of the touch apparatus through the at least one touch-sensing electrode;
a vibration control circuit, electrically coupled to the at least one vibration electrode, and configured to drive the at least one vibration electrode to generate a vibration, wherein one of the at least one vibration electrode is a sound electrode, and the sound electrode generates a sound through the vibration; and
a display panel, disposed below the substrate, wherein a gap is provided between the display panel and the substrate, and the gap is configured to serve as a resonance chamber of the sound electrode.

* * * * *